US005373618A

United States Patent [19]

Doyle et al.

[11] Patent Number: 5,373,618

[45] Date of Patent: Dec. 20, 1994

[54] METHOD OF REMOVING STRETCHABLE SLEEVES FROM BOTTLES

[75] Inventors: Gerard B. Doyle, Liverpoole, England; Richard W. Hess, Hudson, Ohio

[73] Assignee: Automated Label Systems Company, Twinsburg, Ohio

[21] Appl. No.: 12,255

[22] Filed: Feb. 1, 1993

[51] Int. Cl.[5] .............................................. B23P 19/00

[52] U.S. Cl. .................................. 29/426.3; 29/426.6; 29/235

[58] Field of Search ................. 29/403.1, 403.3, 426.1, 29/426.3, 426.5, 426.6, 235, 239, 282; 15/59, 60; 156/344, 584; 134/144, 145, 151; 414/416

[56] References Cited

U.S. PATENT DOCUMENTS

| | | | |
|---|---|---|---|
| 2,516,998 | 8/1950 | Kimball et al. | 15/60 |
| 2,573,169 | 10/1951 | Gerlach et al. . | |
| 2,863,579 | 12/1958 | Meyer | 414/416 |
| 3,022,573 | 2/1962 | Bullock | 29/235 |
| 3,069,035 | 12/1962 | Schwarz et al. | 414/416 |
| 3,534,428 | 10/1970 | Pugh et al. | 15/60 |
| 3,970,201 | 7/1976 | Keene | 414/416 |
| 3,996,825 | 12/1976 | Terry . | |
| 4,013,497 | 3/1977 | Wolf . | |
| 4,026,003 | 5/1977 | Leone et al. | 29/235 |
| 4,152,958 | 5/1979 | Bogert . | |
| 4,325,775 | 4/1982 | Moeller | 15/60 |
| 4,402,123 | 9/1983 | Mitchell | 29/426.5 |
| 4,717,442 | 1/1988 | Hopson . | |
| 4,830,699 | 5/1989 | Burlet et al. . | |
| 4,834,826 | 5/1989 | Abe et al. . | |
| 5,031,496 | 7/1991 | Lobash et al. . | |
| 5,072,504 | 12/1991 | Thompson | 29/426.6 |
| 5,152,865 | 10/1992 | Hurst . | |

*Primary Examiner*—Mark Rosenbaum
*Assistant Examiner*—David P. Bryant
*Attorney, Agent, or Firm*—Watts, Hoffmann, Fisher & Heinke Co.

[57] ABSTRACT

A method and apparatus for removing film sleeves from objects quickly and easily. The apparatus includes a housing and frame structure adapted to be shifted from a vessel pick-up station to a vessel processing station. A plurality of transfer heads carried by the frame structure are provided. Each head is positioned to grasp an associated one of a set of vessels disposed in a transport case positioned at the pick-up station. A transfer head actuating structure is adapted to cause the heads respectively associated with vessels at the pick-up station to substantially concurrently grasp the associated vessels. The frame structure is then shifted to shift the vessels to the processing station as the frame structure is shifted to the processing station. The actuating structure is further adapted to cause the heads to release associated vessels once they are transferred to the processing station. Desleeving structure in the form of a plurality of nozzles is provided and is carried by the housing and frame structure. A set of nozzles is associated with each of the heads and is positioned when in use in circumferentially spaced relationship relative to a grasped vessel. The nozzles are oriented for direction of fluid streams tangentially against a surface of a grasped vessel.

35 Claims, 6 Drawing Sheets

METHOD OF REMOVING STRETCHABLE SLEEVES FROM BOTTLES

TECHNICAL FIELD

This invention relates to apparatus and methods for removing sleeves from objects, and more particularly, for removing plastic sleeves from bottles.

CROSS-REFERENCE

U.S. patent application Ser. No. 07/789,257 filed Nov. 7, 1991 by Hershey Lerner et al. entitled "High-Speed Sleever," (hereinafter the "Labeler Patent").

U.S. patent application Ser. No. 07/941,388 filed Sep. 8, 1992 entitled "Delabeler and Method," now U.S. Pat. No. 5,317,794, (hereinafter the "Delabeler Patent").

BACKGROUND OF THE INVENTION

Product containers such as bottles, are labeled by various methods. Early methods involved either printing information directly onto the container or alternatively printing the information on a paper label that was then adhesively bonded to the container. More recently, paper labels have often been supplanted by plastic labels because they are inexpensive and provide an attractive appearance. While adhesively-secured labels inhibit recycling, they continue to be used because of the speed with which bottles can be labeled. With the introduction of the machine of the Delabler Patent, tubular plastic sleeves have become an economical alternative to wrap around adhesively bonded labels.

When an adhesive-connected plastic label is used on a plastic bottle, the portion of the bottle contacting the adhesive is not economically recoverable with known recycling processes because the label and bottle plastics are different, typically polyethylene for labels and P.E.T. for the bottles, and the label cannot be separated from the bottle. Moreover, such bottles normally are not reusable for the same reason. When non-adhesive sleeves are used, the sleeves can be separated from the bottles thereby making all or substantially all of each bottle and label recyclable and allowing for the reuse of the bottle in the alternative. Thus, sleeved bottles comply with laws mandating fully recyclable bottles.

While tests have shown the machine of the Delabeler Patent to be quite satisfactory for some applications, currently there are no satisfactory methods or apparatus for facilitating bottle reuse by economically and concurrently removing plastic labels from each bottle of a set of bottles. Consequently, in many applications, paper labels, rather than less expensive and more attractive plastic labels, continue to be used on reusable bottles.

In desleeving operations, the effort to remove the sleeve from the bottle is resisted by the frictional forces between the sleeve and bottle. Sleeves for bottles are initially smaller in diameter than the bottle being sleeved. Thus, each sleeve is stretched as it is placed on the bottle. In addition to the friction induced by stretching the labels, other factors can exacerbate the frictional resistance to removing a sleeve over a bottle. For example, some types of plastic used for bottles such as polyethylene, have a low-friction surface, but others such as PET material, have a very high-friction surface. Some labels have printing on their inside surfaces. Such printing increases the friction between the sleeve and the bottle. Additionally, it has recently been learned that there is a problem with non-adhesive sleeves in that when a sleeve becomes wet, after the sleeve has dried, it will be "adhered" to the bottle even though it is non-adhesive. This "adherence" makes it difficult to remove the sleeve.

Accordingly, there is a need for a reliable, low cost method and apparatus for removing tubular sleeves from set of fluid vessels to allow economic reuse.

SUMMARY OF THE INVENTION

The present invention provides a method and apparatus for removing film sleeves from objects quickly and easily. The preferred embodiment of the present invention adds the desleeving apparatus to a bottle decaser that is used to transfer a set of bottles from a carrier to a washing machine. By adding the desleeving apparatus to the decaser, the desleeving process is performed quickly, cleanly and easily during a step that is currently performed in bottle reusing processes, specifically the decasing step. The desleeving step is therefore effectively added a bottle reusing system without adding any time to the overall process.

An apparatus made in accordance with the present invention includes a housing and frame structure adapted to be shifted from a vessel pick-up station to a vessel processing station. A plurality of transfer heads are provided and carried by the frame structure. Each head is positioned to grasp an associated one of a set of vessels disposed in a transport case positioned at the pick-up station.

A transfer head actuating structure is provided and is operatively connected to the transfer heads. The actuating structure is adapted to cause the heads to substantially concurrently grasp respectively associated vessels at the pick-up station. The frame structure is then shifted to shift the vessels to the processing station. The actuating structure is further adapted to cause the heads to release such associated vessels once they are transferred to the processing station.

Additionally, desleeving structures are provided and carried by the housing and frame structure. Each desleeving structure is associated with a head and is adapted to strip a sleeve from a vessel as it is transferred from the pick-up station to the processing station.

In the preferred and illustrated form of the invention, each desleeving structure comprises a plurality of nozzle or jet sets with each set being connected to an associated one of the heads and positioned, when in use, in circumferentially spaced relationship relative to a grasped vessel. The nozzles are oriented for direction of fluid streams tangentially against a surface of a grasped vessel. Each of the nozzles is connected to a supply of fluid under pressure. In the preferred embodiment, the fluid supplied under pressure is water.

The jets of a set are positioned in an array of circular cross section coaxial with the axis of a grasped vessel. The jets force water down along the vessel and these jets of water work their way under the label to stretch it, whereupon a circumferential fluid film is formed between the surface of the object and the sleeve thereby dispelling the sleeve from the vessel.

The fluid emitted from the jets can channel under the sleeve, especially if the sleeve has become adhered to the bottle. While jets with circular outlet passages are usually quite satisfactory, for some applications the jets preferably have elongated, curved openings or slots for the emission of the fluid. This widens the streams of fluid emitted from the jets thereby improving the formation of the fluid film and helping to minimize channeling of the fluid streams.

One embodiment of the present invention reciprocates the vessels and jets relative to one another as the fluid is impinged on the vessels to further help minimize channeling of the fluid streams and to increase the fluid pressure available for flushing labels from vessels as the delabeling reaches its conclusion. Alternatively or additionally, the vessels and jets are rotated relatively. These measures improve the efficiency with which each sleeve is dispelled from its vessel by improving the formation of the circumferential fluid film.

Overall, the present invention provides a simple and compact system for desleeving containers. The basic premise of the invention is to reduce the friction between the sleeve and the container by providing a fluid film, stretching the sleeve to separate it from the surface of the container and forcing the sleeve to move off of the container.

It is helpful in certain applications to use hot water when desleeving vessels to heat the plastic labels and thereby soften them while assisting in cleansing and decontaminating the vessels.

Accordingly, the object of the invention is to provide a novel desleever system for desleeving containers such as bottles and a novel method of desleeving.

DETAILED DESCRIPTION OF THE PREFERRED EMBODIMENT

Figure 1:
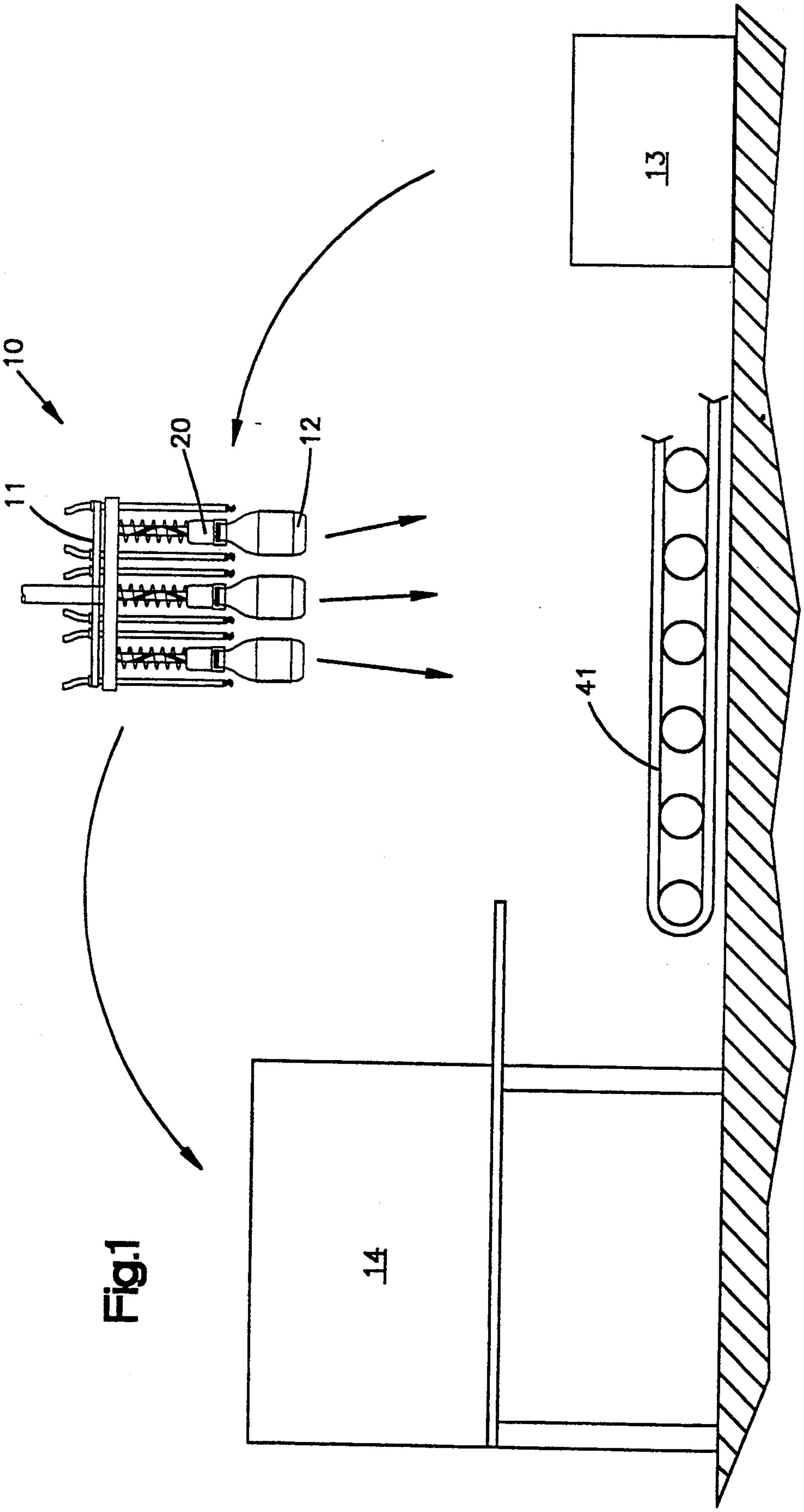
FIG. 1 is a schematic of a transfer operation including a transfer mechanism that includes a desleeving system.
Figure 2:
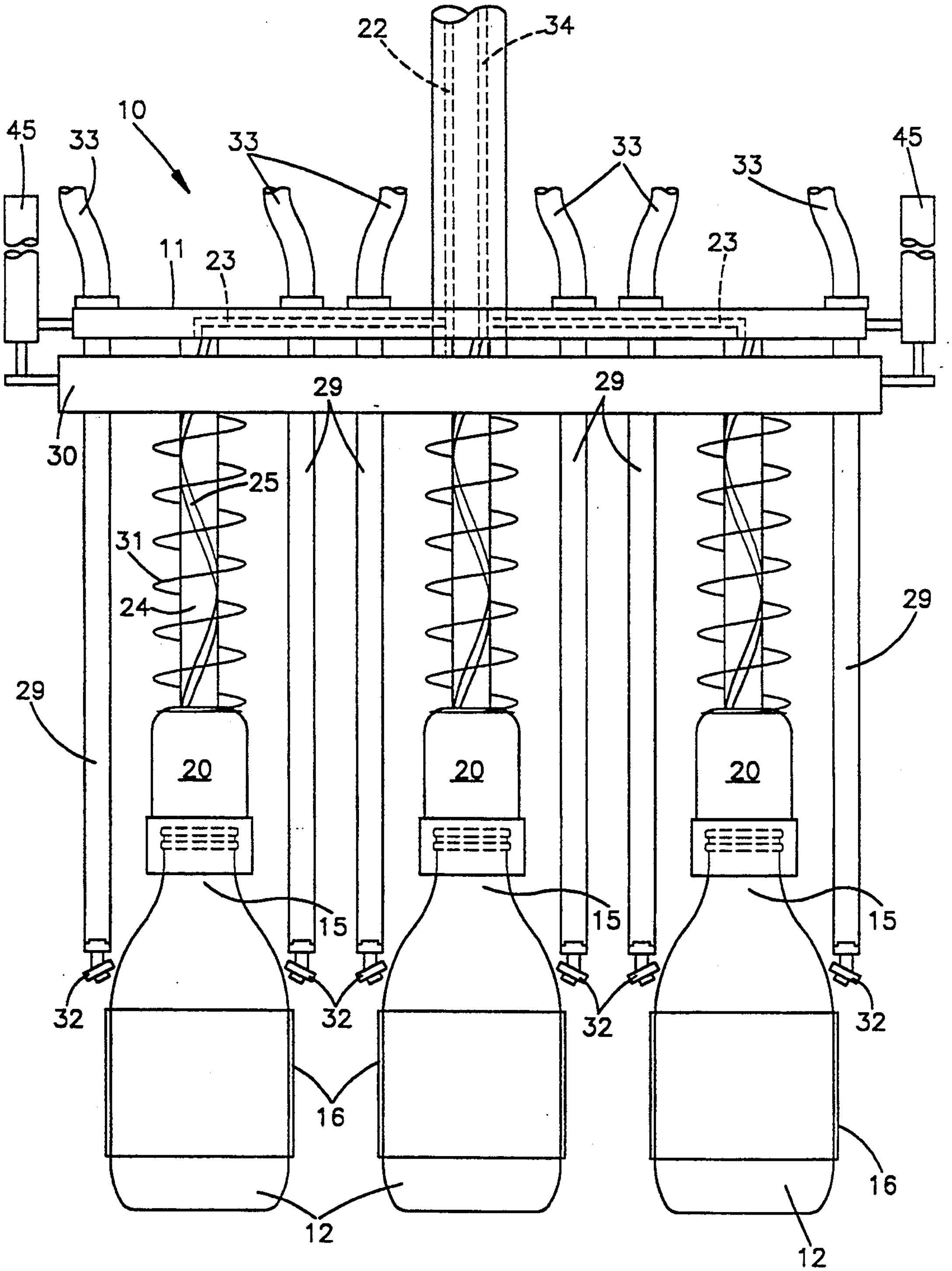
FIG. 2 is a side elevational view of a the preferred embodiment of the transfer mechanism including the desleeving system built in accordance with the present invention.
Figure 3:
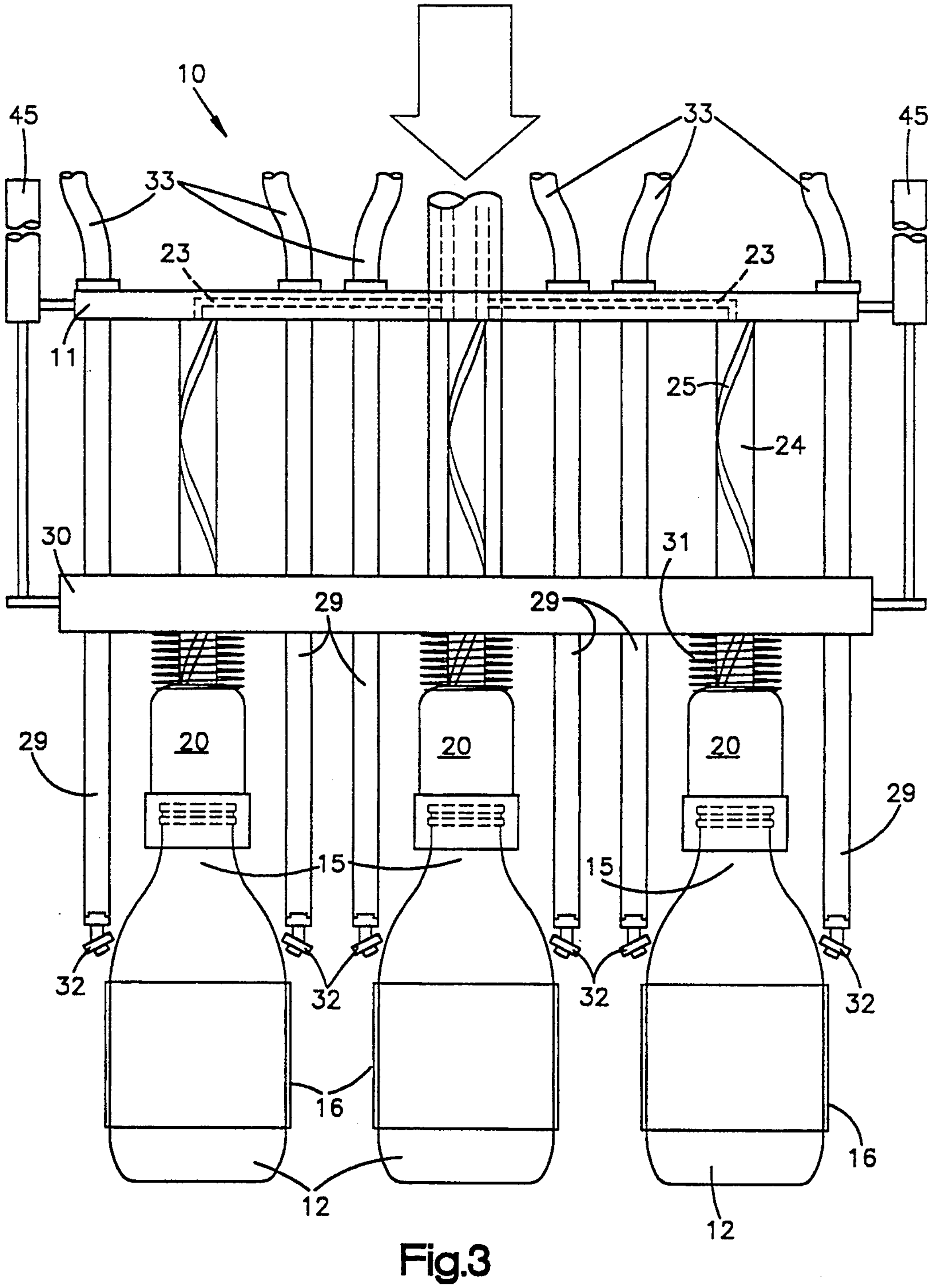
FIG. 3 is a side elevational view of the transfer mechanism including the desleeving system illustrated in FIG. 2 illustrating the system in operation.
Figure 4:
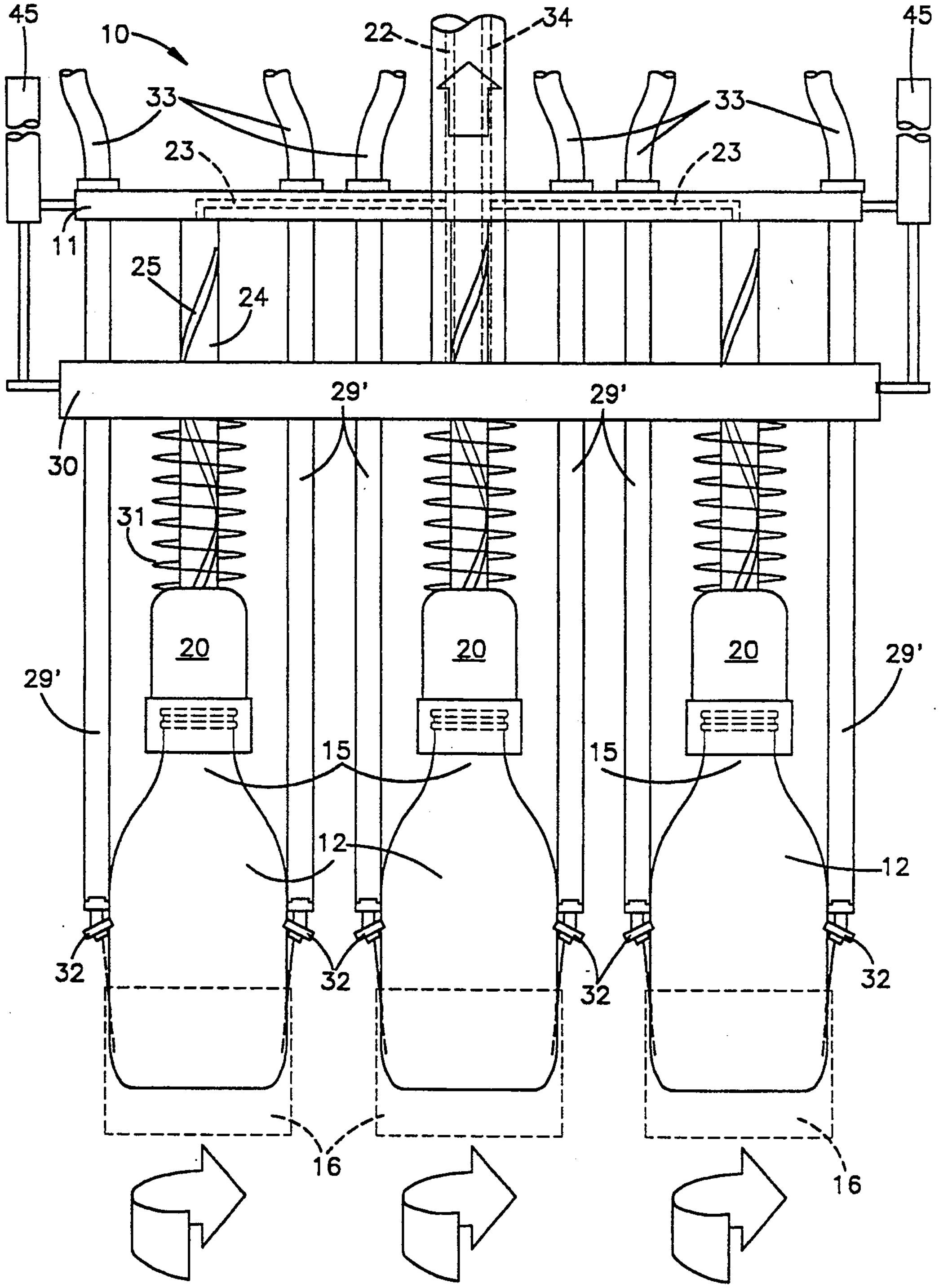
FIG. 4 is a side elevational view of the transfer mechanism including the desleeving system illustrated in FIGS. 2 and 3 illustrating the system in further operation.

Turning to the drawings, a transfer mechanism 10 having a frame structure 11 is illustrated. The transfer mechanism 10 is used to simultaneously move a set of bottles 12 from a transport case 13 to a washing machine 14. Each bottle includes a neck 15 and a surrounding label 16. The label 16 is retained in position around the bottle through the inherent elasticity of the label and frictional engagement of the inner surface of the label with the outer surface of the bottle.

The illustrated transfer mechanism 10 is a milk bottle decaser and includes a plurality of transfer heads 20 each of which is constructed to grasp a bottle. The number of transfer heads corresponds to the number of bottles that are carried by the transport case 13. For purposes of description in this patent, nine transfer heads are illustrated, arranged in 3×3 rows.

Each transfer head 20 has an elastomeric bladder 21 that is air inflatable. Air under pressure is provided from an external source (not shown) and travels through a hose 22 that connects the transfer mechanism 10 to the external source. The transfer mechanism includes hoses 23 to distribute such compressed air to each individual grasper 20.

Each head 20 is connected to the transfer mechanism via a corresponding stem 24. The stems 24 are journaled in the frame structure 11 for axially fixed relative rotation. Each stem 24 has a spiraling groove 25 defined within an outer surface. The spirally grooved stems are similar to those found in what are commonly known as "yankee screwdrivers."

A platform 30 is mounted intermediate the frame structure 11 of the transfer mechanism and the heads 20. The stems 24 respectively extend through holes defined within the platform. Projections (not shown) are provided in the holes to engage walls defining the spiral grooves 25. Coaction of the projections and groove walls causes the stems 24 to rotate within their respective holes when the platform 30 is reciprocated relative to the frame 11. Springs 31 around each stem 24 bias the platform away from the heads and towards the frame structure 11.

In the illustrated embodiment of FIGS. 2–5, four nozzles 32 are circumferentially placed around each head 20 to emit fluid streams, preferably water. The nozzles are connected to the frame 11 and are connected to an external water source (not shown) by conduits 29 and hoses 33. A conduit 34 connects the transfer mechanism to the external water source.

Figure 5:
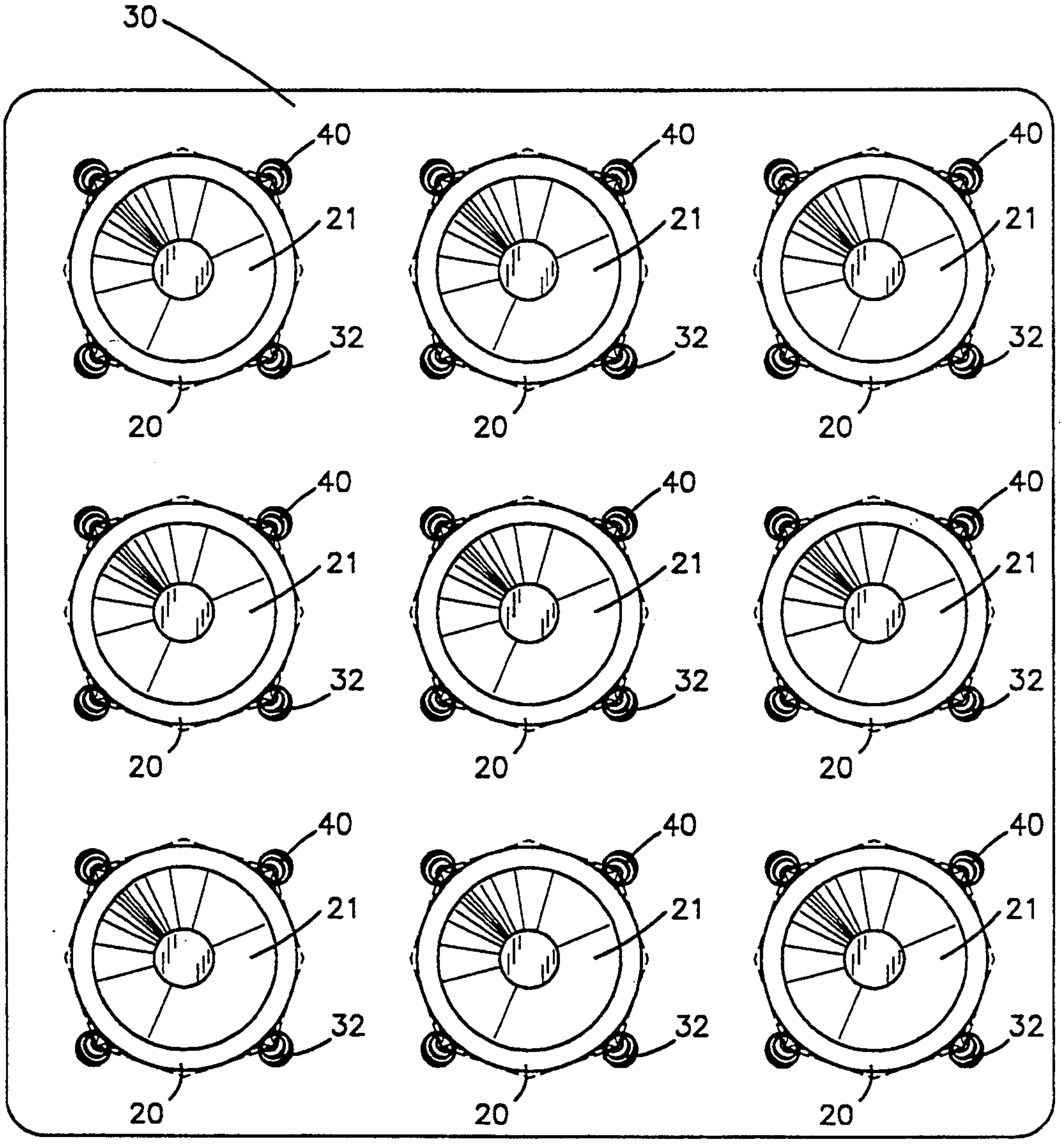
FIG. 5 is a bottom view of the transfer mechanism including the desleeving apparatus illustrated in FIGS. 2–4; and, FIG. 6 is a side elevational view of a single desleeving apparatus according to one embodiment of the present invention with some parts shown in cross section and other parts removed.

As best seen in FIG. 5, each nozzle 32 has an outlet 40 that normally is circular, but for some applications is preferably the shape of an arcuately curved slot. For such applications, the slots are circumferentially elongate and curved in transverse cross section and preferably are 0.020" thick. Each curved outlet causes the water emitted from its nozzle 32 to be in a stream that conforms to the rounded shape of the bottle 12. This improves the formation of a fluid film under the label 16 and thereby improves the process of removing the label from the bottle 12.

Each nozzle outlet is preferably at an angle such that the stream emitted has an angle of tangency of the order of 5.5 degrees relative to the bottle. Tests indicate this angle optimizes water penetration under the label, thereby facilitating the process of removing the label from the bottle.

OPERATION

In operation, the decaser 10 is placed over the transport case 13 that is carrying a set of bottles 12 to be reused. The decaser is placed over the transport case such that each grasper 20 engages a corresponding bottle 12. Air is supplied to each bladder 21, causing it to inflate, and thereby surround the associated bottle's neck 15. As the decaser is picked up and thereby the bottles, water is supplied to the nozzles 32. Preferably, the water supplied is maintained in a pressure range of from 80 to 500 p.s.i. Simultaneously, actuators 45 (FIG. 4) shift the platform 30 relative to the frame 11 from the position of FIG. 2 to the position of FIG. 4 to cause telescopic conduits 29' (FIG. 4) to extend and reciprocate downwardly following the labels as they are expelled. Alternatively as in FIGS. 2 and 3 or additionally as in FIG. 4, downward movement of the platform causes the stems 24 and grasped bottles to spin. With each embodiment, the streams of water stretch the label away from the bottle and create a circumferential fluid film under the label. The downward force of the water being emitted from the nozzles causes the label to be flushed from the bottle. The relative reciprocation and/or rotation of the bottles and nozzles minimizes the channeling of the water under each label 16, and thereby contributes to the creation of a substantially 360° fluid film under the label.

As the labels 16 are flushed from the bottles 12, the water from the nozzles and the dispelled labels drop onto suitable structures such as a screen conveyor shown schematically at 41 in FIG. 1. The water passes through the screen conveyor 41 into a suitable drain or collection vat (not shown) while the separated labels are transported by the screen conveyor 41 to a collection bin (not shown). The delabeled bottles 12 are delivered to the washing machine 14 and the bladders 21 are deflated to release the bottles.

As is readily apparent, the label removal process has been added to an already existing step within a bottle reusing system. Bottles are transferred by decasers from transport cases to washing machines in existing bottle reusing processes. Accordingly, by adding the delabeler system to the decasing step, no time for desleeving is added to a current bottle reusing system.

Another advantage can be realized with the use of the desleeving system when hot water is used to remove the labels. The hot water can at least partially sanitize and help in the ultimate cleaning of the bottles while softening labels, thereby improving the ease with which the labels are dispelled from the bottles.

ALTERNATIVE TRANSFER HEAD EMBODIMENT

Figure 6:
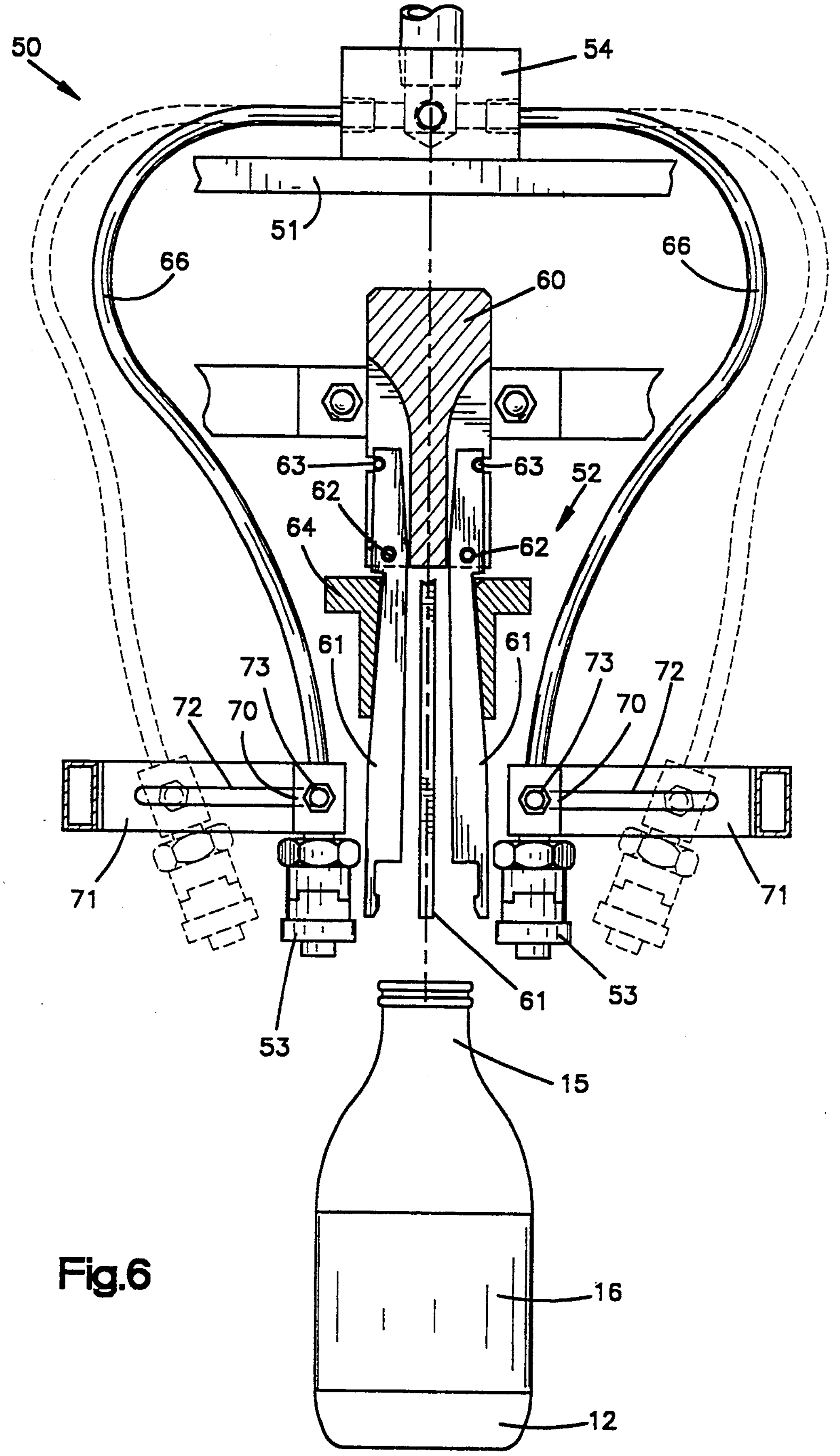

FIG. 6 illustrates an alternative transfer head embodiment of a delabeler apparatus 50. The apparatus 50 includes a frame 51, a vessel grasper 52 and a plurality of fluid nozzles 53. Each nozzle emits a fluid stream that impinges a grasped vessel in order to remove the label from the vessel.

The grasper 52 has a housing 60 that is connected to the frame structure 51. Three fingers 61 are pivotably mounted within the housing 20. Each finger 61 is mounted within the housing 60 by a dowel pin 62 about which the finger pivots. A spring 63 surrounds an upper portion of all three fingers and biases a lower portion of each finger away from the other fingers' lower portions.

A camming ring 64 surrounds the three fingers 61. The ring 64 is connected to an actuator (not shown) and is mounted such that it will slide along the length of the three fingers. When the ring is slid towards the bottom of the fingers, the three fingers pivot about their respective pins 62 and grasp a vessel or bottle 11. To release the bottle, the sleeve slides towards the top of the fingers and the spring 63 biases the fingers apart.

Preferably there are six nozzles, and each nozzle is connected to a water manifold 65 with a corresponding hose 66. The water manifold is connected to an external water source (not shown).

Adjacent each nozzle and surrounding each nozzle's corresponding hose is a collar 70. Each collar 70 is placed within a corresponding bracket 71 that is connected to the frame 51. Within each bracket 71 are slots 72 that are defined within opposite sides of the bracket 71. Each collar 70 is placed within its corresponding bracket 71 and a bolt 73 is placed through each slot 72 into a corresponding bore (not shown) defined within the collar. This attaches the collar and thereby each nozzle in an operating position.

The operating position of each nozzle can be adjusted by loosening the bolts 73 and moving the collars, and thereby the corresponding nozzles, within their brackets. The bolts can slide along the slots 72, thereby allowing the nozzle to be placed along an outer periphery of a bottle to accommodate bottles of varying sizes. Additionally, as indicated in phantom in FIG. 6, the angle at which the nozzles are placed can be adjusted. By placing the nozzles at an appropriate angle, optimized creation of a film of water is achieved through an appropriate angle of impact and relative spacing of the bottle and nozzle.

Preferably the nozzles are placed such that the stream emitted has an angle of tangency of 5.5 degrees relative to the bottle. This allows the water to get under the sleeve completely, creating an optimized fluid film, and thereby optimizing the process of removing the label from the bottle.

As in the preferred embodiment, outlets of each nozzle 53 are, for some applications, preferably in the shape of a semi-circular slots. The slots are each circumferentially elongate and curved in transverse cross section.

In operation, a bottle 12 is positioned under the fingers 61 and in such a position that the fingers can grasp the bottle around its neck 15. Once the bottle is so positioned, the camming ring 64 is moved downwardly along the fingers, causing the fingers to pivot and grasp the bottle 12. Once the bottle is securely grasped by the fingers, water is supplied from the manifold 65 and travels through the hoses 66 and exits the nozzle outlets to flush a label from the grasped bottle.

Although the preferred embodiments of this invention have been shown and described, it should be understood that various modifications and rearranging of parts may be resorted to without departing from the scope of the invention as disclosed and claimed.

We claim:

1. A method of removing a stretchable plastic sleeve label from a fluid filled vessel wherein the sleeve circumferentially surrounds and engages a surface of the vessel, said method comprising:

a) directing a plurality of circumferentially spaced, fluid streams from spaced jets angularly toward the sleeve and against the surface at locations near the sleeve, the streams being directed through the ambient atmosphere;

b) continuing to direct the streams against the surface and thereby stretching a portion of the sleeve out of engagement with the surface; and, c) further continuing to direct the streams against the surface until a circumferential fluid film is formed between the surface and the sleeve and the sleeve is expelled from the vessel.

2. The method of claim 1 wherein the fluid is water.

3. The method of claim 1 wherein the streams are provided by flowing water through a plurality of circumferentially spaced jets.

4. The method of claim 3 wherein the jets have outlets that are circular in transverse cross section.

5. A process of removing a plastic sleeve label positioned around a fluid vessel from frictional engagement with the vessel wherein the sleeve is of the type which is retained in position around the vessel through inherent elasticity of the sleeve and frictional engagement of an inner surface of the sleeve with an outer surface of the vessel, said process comprising:

a) impinging a flow of fluid angularly toward the sleeve against the vessel surface near an end of the sleeve;

b) continuing the impingement until a circumferential layer of fluid is established between the surfaces at a location adjacent said end;

c) further continuing the impingement until the fluid layer is of sufficient size that the position retention through frictional engagement is reduced to a level such that the impinging flow can overcome the friction of engagement; and, d) still further impinging the fluid and thereby stripping the sleeve from the vessel.

6. The process of claim 5 wherein the fluid is water.

7. The process of claim 5 wherein the impinging steps are accomplished by directing a plurality of circumferentially spaced fluid streams angularly against the vessel surface.

8. The process of claim 7 wherein the angle of the angular impingement is of the order of 5.5 degrees.

9. The process of claim 7 wherein the streams are provided by flowing water through a plurality of circumferentially spaced jets.

10. The process of claim 9 wherein the jets and the vessel are relatively rotated as the streams are impinged on the vessel.

11. The process of claim 9 wherein the jets and vessel are relatively reciprocated as the streams are impinged on the vessel.

12. A process of stripping a plastic sleeve type label from a bottle, the label being of the type which relies on its inherent resiliency and friction to retain it in an appropriate position on the bottle without adhesive connection, said process comprising:

a) directing a plurality of jets of water toward the bottom of the bottle and angularly against the bottle at a location between the bottle's neck and the top of the label;

b) maintaining the jets at appropriate volumes, pressures and angles to establish a perimetral film of water between an upper portion of the label and the bottle while avoiding the establishment of flow channels between the label and the bottle of volumes which would prevent the water from flushing the label from the bottle; and, c) continuing to direct the water jets against the bottle until the label is flushed from the bottle.

13. The process of claim 12 wherein each of the jets is directed from a nozzle having an orifice sized to produce a jet having a thickness of the order of 0.020 inches.

14. The process of claim 13 wherein the water supplied to the nozzles is maintained in a pressure range of from 80 to 500 p.s.i.

15. The process of concurrently removing a label from each bottle of a set comprising concurrently performing the process of claim 12 with each of the bottles of the set.

16. The process of claim 12 wherein the jets and the bottle are relatively reciprocated as the jets are directed toward the bottle.

17. A method of removing a stretchable sleeve from an object, wherein the sleeve surrounds and engages a surface of the object, said method comprising:

a) directing a plurality of circumferentially spaced, fluid streams angularly toward the sleeve and against the surface at locations near the sleeve by flowing water through a plurality of circumferentially spaced jets;

b) continuing to direct the streams against the surface and thereby stretching a portion of the sleeve out of engagement with the surface;

c) further continuing to direct the streams against the surface until a fluid film is formed between the surface and the sleeve and the sleeve is expelled from the object; and, d) relatively rotating the jets and the object as the streams are impinged on the object.

18. A method of removing a stretchable sleeve from an object wherein the sleeve surrounds and engages a surface of the object, said method comprising:

a) directing a plurality of circumferentially spaced, fluid streams angularly toward the sleeve and against the surface at locations near the sleeve by flowing water through a plurality of circumferentially spaced jets having outlets that are circumferentially elongate and are curved in transverse cross section;

b) continuing to direct the streams against the surface and thereby stretching a portion of the sleeve out of engagement with the surface; and, c) further continuing the direction of the streams against the surface until a fluid film is formed between the surface and the sleeve and the sleeve is expelled from the object.

19. A process of removing a sleeve from an object wherein the sleeve is of the type which is retained in position around the object through inherent elasticity of the sleeve and frictional engagement of the inner surface of the sleeve with the outer surface of the object, said process comprising:

a) impinging a flow of fluid angularly toward the sleeve and against the object surface near an end of the sleeve;

b) continuing the impingement until a circumferential layer of fluid is established between the surfaces at a location adjacent said end;

c) further continuing the impingement until the fluid layer is of sufficient size that the position retention through frictional engagement is reduced to a level such that the impinging flow can overcome the friction of engagement;

d) still further impinging the fluid and thereby stripping the sleeve from the object; and, e) relatively reciprocating and rotating the jets and objects as the streams are impinged on the object.

20. A process of removing a sleeve from an object wherein the sleeve is of the type which is retained in position around the object through inherent elasticity of the sleeve and frictional engagement of the inner surface of the sleeve with the outer surface of the object, said process comprising:

a) impinging a flow of fluid angularly toward the sleeve and against the object surface near an end of the sleeve by flowing water through a plurality of circumferentially spaced jets, the jets having outlets that are circumferentially elongate and are curved in transverse cross section;

b) continuing the impingement until a circumferential layer of fluid is established between the surfaces at a location adjacent said end;

c) further continuing the impingement until the fluid layer is of sufficient size that the position retention through frictional engagement is reduced to a level such that the impinging flow can overcome the friction; and, d) still further impinging the fluid and thereby stripping the sleeve from the object.

21. A process of stripping a plastic sleeve type label from a bottle, the label being of the type which relies on its inherent resiliency and friction to retain it in an appropriate position on the bottle without adhesive connection, said process comprising:

a) directing a plurality of jets of water toward the bottom of the bottle and angularly against the bottle at a location between the bottle's neck and the top of the label;

b) maintaining the jets at appropriate volumes, pressures and angles to establish a perimetral film of water between an upper portion of the label and the bottle while avoiding the establishment of flow channels between the label and the bottle of volumes which would prevent the water from flushing the label from the bottle;

c) continuing to direct the water jets against the bottle until the label is flushed from the bottle; and, d) relatively rotating the jets and the bottle as the jets are directed toward the bottle.

22. The process of claim 21 wherein the jets and the bottle are relatively reciprocated as the jets are impinged on the bottle.

23. A method of removing stretchable sleeves from objects, each sleeve surrounding and engaging a surface of an associated one of the objects, the method comprising:

a) concurrently directing a plurality of circumferentially spaced sets of fluid streams with the streams of each set being angularly directed against the surface of an associated object toward and at locations near the associated object's sleeve;

b) continuing to direct the streams against the surfaces and thereby stretching portions of each of the sleeves out of engagement with its associated surface; and c) further continuing to direct the streams against the surfaces until a fluid film is formed between each of the surfaces and its associated sleeve and the sleeves are expelled from the objects.

24. The method of claim 23 wherein the sets of streams are each provided by flowing water through a plurality of circumferentially spaced jets.

25. The method of claim 24 wherein each of the jets and its associated object are relatively rotated as the streams are directed against the objects.

26. The method of claim 24 wherein the jets have outlets that are circumferentially elongate and are curved in transverse cross section.

27. A process of stripping plastic sleeve type labels each from an associated one of a plurality of bottles, each label being of the type which relies on its inherent resiliency and friction to retain it in an appropriate position on an associate bottle without adhesive connection, comprising:

a) concurrently directing a plurality of sets of jets of water with the jets of each set being directed toward the bottom of an associated one of the bottles and angularly against the associated bottle at a location between the bottle's neck and the top of the label;

b) maintaining the jets of each set at appropriate volumes;, pressures and angles to establish perimetral films of water between an upper portion of each label and its associated bottle while avoiding the establishment of flow channels between the associated label and bottle of volumes which would prevent the water from flushing the label from the bottle; and, c) continuing to direct the water jets against the bottles until the labels are flushed from the bottles.

28. The process of claim 27 wherein the jets of each set and the associated bottles are relatively rotated as the jets are directed against the bottles.

29. The process of claim 28 wherein the jets of each set and the associated bottles are relatively reciprocated as the jets are directed against the bottles.

30. The process of claim 27 wherein the jets of each set and the associated bottles are relatively reciprocated as the jets are directed against the bottles.

31. The process of claim 27 wherein a transfer mechanism grasps a set of bottles disposed in a case and transfers them from the case to another location and wherein the stripping steps are performed concurrently with the transfer.

32. A process of processing bottles for reuse comprising a) sequentially delivering cases each containing a set of bottles to a transfer location;

b) concurrently grasping the bottles of a set;

c) removing the grasped bottle set from its case and transferring the grasped set to another location; and, d) concurrent with this transfer step, removing labels from the bottles of the grasped set.

33. The process of claim 32 wherein the labels are of the type which are retained in position around their associated bottles through inherent elasticity of the labels and frictional engagement of an inner surface of each label with an outer surface of each associated bottle and wherein the label removal step comprises:

a) impinging a flow of fluid angularly against each bottle surface near an end of and toward its associated label;

b) continuing the impingement until circumferential layers of fluid are established between the surfaces of each label and its associated bottle at a location adjacent said end;

c) further continuing the impingement until the fluid layers are of sufficient size that the frictional engagement is reduced to a level such that the impinging flow can overcome the friction of engagement; and, d) still further impinging the fluid and thereby flushing the labels from the bottles.

34. The process of claim 32 wherein the labels are stretchable sleeves and each sleeve surrounds and engages a surface of an associated one of the bottles, wherein the label removal step comprises:

a) concurrently directing a plurality of circumferentially spaced sets of fluid streams with the jets of each set being angularly directed against the surface of an associated bottle toward the associated bottle's sleeve and at locations near the associated bottle's sleeve;

b) continuing to direct the streams against the surfaces and thereby stretching portions of each of the sleeves out of engagement with its associated surface; and c) further continuing to direct the streams against the surfaces until a fluid film is formed between each of the surfaces and its associated sleeve and the sleeves are expelled from the bottles.

35. The process of claim 32 wherein the labels are plastic sleeve type labels each on an associated one of the bottles, each label being of the type which relies on its inherent resiliency and friction to retain it in an appropriate position on an associate bottle without adhesive connection and wherein the label removal step comprises:

a) concurrently directing a plurality of sets of jets of water with the jets of each set being directed toward the bottom of an associated one of the bottles and angularly against the associated bottle at a location between the bottle's neck and the top of the label;

b) maintaining the jets of each set at appropriate volumes, pressures and angles to establish perimetral films of water between an upper portion of each label and its associated bottle while avoiding the establishment of flow channels between the associated label and bottle of volumes which would prevent the water from flushing the label from the bottle; and, c) continuing to direct the water jets against the bottles until the labels are flushed from the bottles.

* * * * *